United States Patent [19]
Frydenberg et al.

[11] 3,716,179
[45] Feb. 13, 1973

[54] APPARATUS FOR FASTENING STRUCTURAL MEMBERS TOGETHER

[75] Inventors: Donald V. Frydenberg; Troy D. Cain, both of Arlington, Tex.

[73] Assignee: Clary Corporation, San Gabriel, Calif.

[22] Filed: May 3, 1971

[21] Appl. No.: 139,579

[52] U.S. Cl. .....................227/48, 227/100, 227/152
[51] Int. Cl. ...............................................B27f 7/02
[58] Field of Search........227/44, 45, 48, 50, 99, 100, 227/101, 118, 152

[56] References Cited

UNITED STATES PATENTS

| | | |
|---|---|---|
| 2,523,830 | 9/1950 | Klasey et al. ......................227/100 X |
| 2,631,283 | 3/1953 | Cranston, Jr. .....................227/100 X |
| 3,228,580 | 1/1966 | Washington et al. .................227/101 |

*Primary Examiner*—Granville Y. Custer, Jr.
*Attorney*—Fred N. Schwend

[57] ABSTRACT

Apparatus for attaching wooden structural members together in end-to-end relation using nail plates, in which the members are moved continuously through a fastening station. A carriage, located at the station, is clamped to one of the wooden members and a floating press carried by the carriage is actuated to embed the nail plates into opposite sides of adjoining members during movement of the carriage along with the members. Following the embedding operation, the carriage is released and spring returned to an initial position.

13 Claims, 8 Drawing Figures

INVENTORS
DONALD V. FRYDENBERG
TROY D. CAIN

APPARATUS FOR FASTENING STRUCTURAL MEMBERS TOGETHER

BACKGROUND OF THE INVENTION

1. Field of the Invention

This invention relates to apparatus for fastening wooden structural members together and has particular reference to apparatus for fastening nail plates to structural members to join the same together as the latter are moved in end-to-end relation through a fastening station.

2. Description of the Prior Art

Toothed nail plates have been used heretofore to join wooden structural members together for use in fabricating building assemblies such as roof trusses, wall panels, etc.. An example of such a nail plate is shown in the Juriet U.S. Pat. No. 2,877,520 issued on Mar. 17, 1959. Such nail plates, particularly when applied to opposite sides of the wooden members, have proven very satisfactory, largely because of the large number of teeth which are embedded into the adjoining wood members, making the joint, in most cases, as strong as the structural members themselves.

Two methods are generally used in embedding the nail plates in the wooden members. In one case, roller presses are utilized as disclosed in the patent to Standford U.S. Pat. No. 3,212,694, issued on Oct. 19, 1965, to embed the nail plates into the wood during relative movement between the rollers and the wooden members. However, such nail plates must first be located in place and then are generally temporarily attached while the members are stationary and prior to such relative movement. On the other hand, clamp type fluid operated presses are utilized to press the nail plates into the wood. Such presses, however, generally require the wooden members to be held stationary during the clamping or embedding operation.

Although fastening apparatus of the above types are generally satisfactory, they require the wooden members to be held stationary at some point in the assembly in order to properly locate the nail plates in position or to embed the same into the members. In mass producing structural assemblies, this restricts the speed of assembly and thus increases labor costs.

SUMMARY OF THE INVENTION

A principal object of the present invention is to embed nail plates into structural members to be joined during continuous movement of the latter through a fastening station.

Another object is to provide a fastening apparatus of the above type which operates to first locate nail plates in position and then embed them in structural members to be joined, during continuous movement of the latter.

Another object is to provide a fastening apparatus of the above type in which nail plates are hopper fed into position to be embedded in the structural members.

Another object is to automatically embed nail plates in bridging engagement with a pair of structural members when adjacent ends of the latter pass a fastening station.

The manner in which the above and other objects of the invention are accomplished will be readily understood on reference to the following specification, when read in conjunction with the accompanying drawings.

DESCRIPTION OF THE PREFERRED EMBODIMENT

Figures 1, 2:
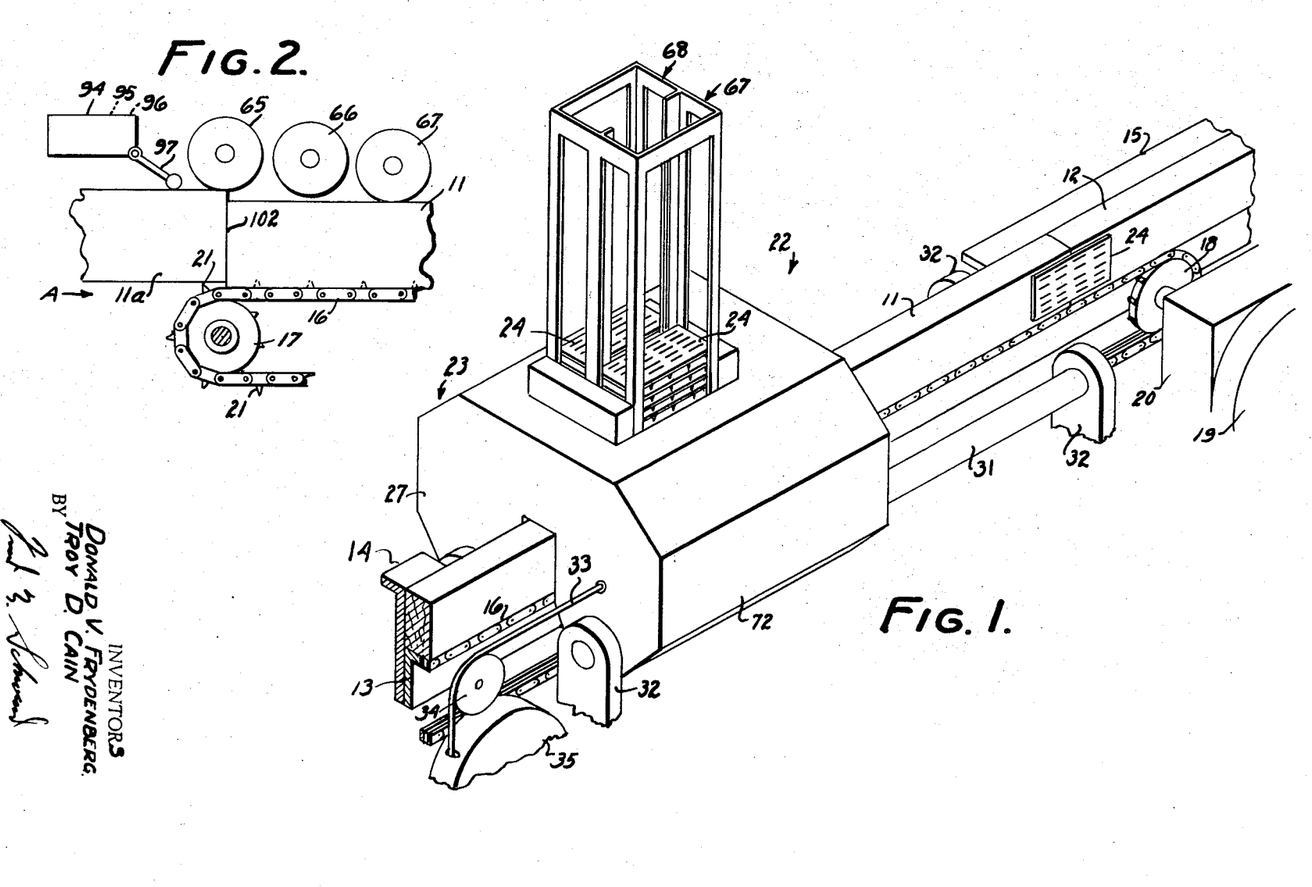
FIG. 1 is a perspective view of a nail plate embedding apparatus embodying a preferred form of the present invention.
FIG. 2 is a fragmentary sectional side view illustrating the mechanism for feeding the plate members.

Although the invention is applicable to the assembly of structural members for many different applications, it is particularly intended to join 2-inch × 4-inch wooden plate members, i.e. 11 and 12, FIG. 1, in end-to-end relation during the fabrication of wall panels in an endless manner, as is disclosed and claimed in the co-pending application of Donald Frydenberg, Ser. No. 139,731, filed May 3, 1971, and titled METHOD AND APPARATUS FOR MAKING WALL PANELS.

In this system the wall panels are formed in a continuous manner to increase the speed of assembly and are subsequently cut into wall panel sections of desired length.

The plate members, i.e., 11 and 12, are guided endwise over a stationary guide member 13 and against spaced but aligned side guide members 14 and 15 forming part of the frame work of an assembly table, not shown. An endless chain 16 is supported below the track of the plate members by sprockets 17 and 18, FIGS. 1 and 2, the latter sprocket being driven by a motor 19 through a suitable gear reduction unit 20. Spurs 21 are formed on certain of the links of chain 16 to engage and drive the plate members in end-to-end relation along the various guide members and past a fastening station generally indicated at 22.

As shown in FIG. 2, as the trailing end of a plate member, i.e., i.e., 11, passes onto the chain 16, a new plate member 11a is suitably placed in abutment therewith and on top of one of the spurs 21 either manually or by an automatic device, not shown. As the new plate member advances it passes under progressively lower pressure rollers 65, 66 and 67 which impale the plate member onto the various spurs 21 enabling a driving connection between the chain and the plate member.

A fastening carriage generally indicated at 23 is provided at the fastening station for attaching nail plates 24 on opposite sides of the adjoining ends of two abutting plate members to form a continuous plate member.

It should be noted that a similar carriage (not shown) is provided to form the second continuous plate member which is spaced from the former to eventually form the top and bottom plates for the ensuing wall panel sections.

Figure 3:
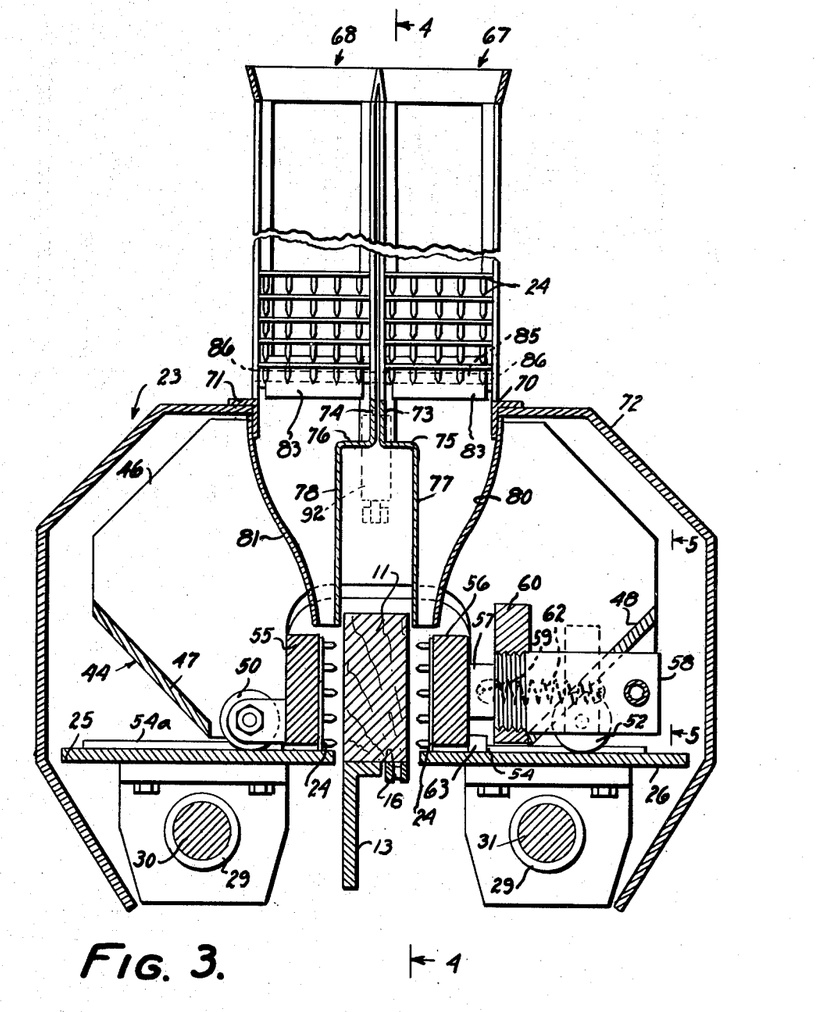
FIG. 3 is a transverse sectional view of the apparatus and is taken along the line 3—3 of FIG. 4.
Figure 4:
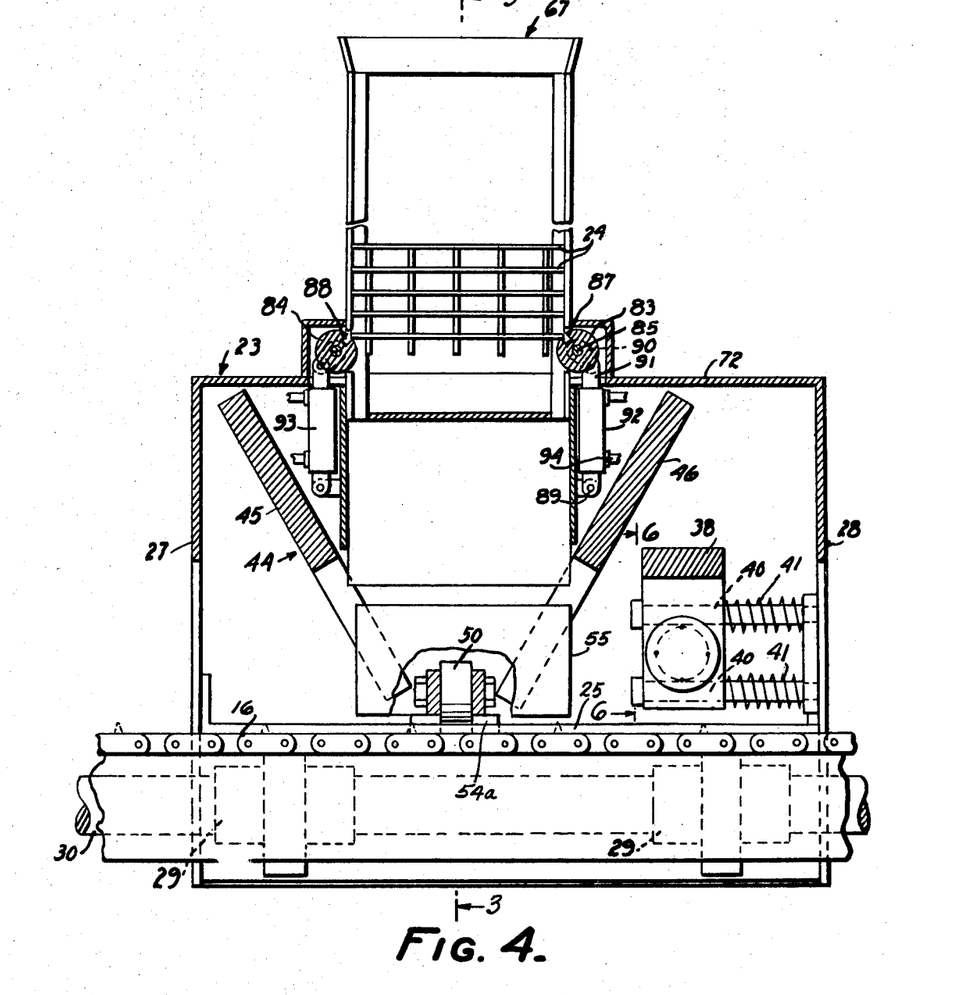
FIG. 4 is generally longitudinal cross section view taken substantially along the line 4—4 of FIG. 3.
Figure 5:
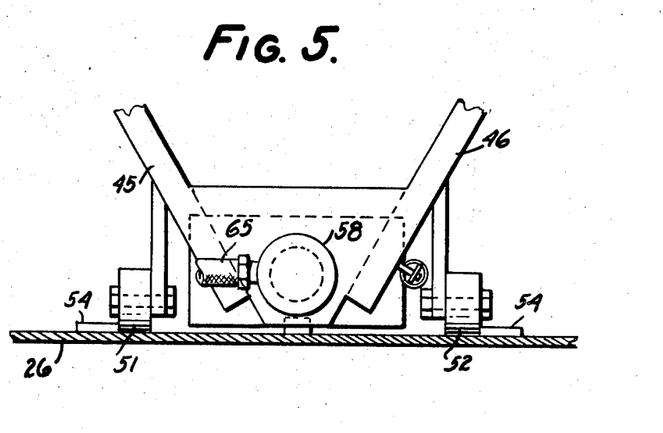
FIG. 5 is a sectional view taken along the line 5—5 of FIG. 3.

The carriage 23 comprises a pair of base plates 25 and 26, FIG. 3, located on opposite sides of the plate member or members and suitably attached to the end walls 27 and 28, FIG. 4, or a housing 72 of the carriage, such end walls straddling the plate member.

Spaced bearings 29 are secured to the base plates 25 and 26 and are slideable along respective ones of a pair guide rods 30 and 31 extending parallel to the direction of movement of the plate members and supported by stationary brackets 32 mounted on the machine framework.

Normally, the carriage 23 is held in its lefthand position shown in FIG. 1 against certain of the brackets 32, and for this purpose it is connected to one end of a cable 33 which passes over a guide roller 34 and connected at its opposite end to a suitable spring drum 35 having a tension spring, not shown, thereon effective to wind the cable onto the drum and thus move the carriage leftward when otherwise allowed to do so.

Figure 6:
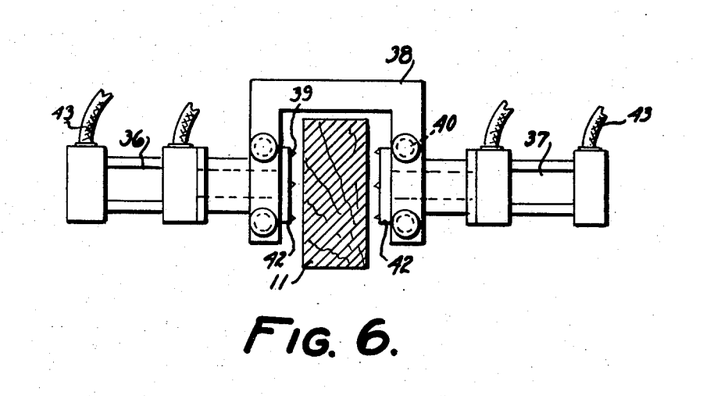
FIG. 6 is a transverse sectional view taken along the line 6—6 of FIG. 4.

Means are carried by the carriage to grip one of the plate members, i.e., 11, as the adjoining ends of two such members pass into the carriage to cause the carrier to move along with the plate members during the attaching operation. For this purpose, a pair of air operated cylinders 36 and 37, FIG. 6, are attached to opposite sides of an inverted U-shaped member 38 which straddles one of the plate members, i.e., 11, and is slideably mounted on rods 40, FIG. 4, extending inwardly from the end wall 28. Compression springs 41 normally hold the member 38 in its position shown in FIG. 4. Platens 42 having spurs 39 thereon are attached to the pistons of the air cylinders 36 and 37, and upon application of air pressure to flexible inlet lines 43 the platens are forced inward to grip the sides of the plate 11, causing the carriage to move along with such plate member against action of the spring drum 35.

A floating C-frame press, generally indicated at 44 FIGS. 3 and 4, is provided to embed nail plates 24 into opposite sides of the plate members. Such press comprises a pair of upwardly diverging C-frames 45 and 46 which straddle the plate member and are welded or otherwise integrally connected to cross member 47 and 48. Rollers 50 and 51, and 52 support the press for movement over the base plates 25 and 26, the rollers being guided by guide strips, i.e., 54 to move transversely of the direction of movement of the carriage.

A first platen 55 is welded or otherwise secured to the C-frames 45 and 46 on one side of the plate member 11 and a second platen 56 is secured to the piston 57 of a hydraulic cylinder 58 integrally attached to a third cross piece 60 attached to the C-frames. A spring 62 is tensioned between the cylinder 58 and a pin 59 extending from its piston and normally retracts the latter to its position illustrated in FIG. 3. The spring 62 also holds the platen 56 against a limit block 63 suitably secured to the base plate 26 and thus forces the platen 55 against the inner ends of guide strips 54a for the rollers 50 to thus space the platens 55 and 56 sufficiently from the plate member to permit the nail plates 24 to extend there between as seen in FIG. 3. If desired, the platens may be magnetized to cause the nail plates to initially adhere to them.

Application of fluid pressure to flexible inlet line 65 of cylinder 58 will extend its piston causing platens 55 and 56 to force both nail plates 24 inwardly to embed the teeth thereof into opposite sides of adjoining ones of the plate members, as will be described further later on. Because of the floating arrangement of the press, equal pressure will be applied to both nail plates.

The various nail plates 24 are initially stacked in horizontal positions in two juxtaposed vertical guide chutes 67 and 68, the walls of which are secured at 70 and 71 to the top of the housing 72. The guide chutes are open at their upper ends and extend through openings in the housing. Their inner guide walls 73 and 74 terminate at shoulders 75 and 76, respectively, formed by guide walls 77 and 78 also forming part of the respective chutes. The lower portions of the latter walls straddle the upper portions of the sides of the underlying plate member, i.e., 11. The outer walls 80 and 81 of the chutes curve inwardly and terminate directly above the inner facing surfaces of the platens 55 and 56 when the latter are retracted, as shown in FIG. 3.

Normally two stacks of nail plates 24 are held in the upper ends of the chutes 67 and 68 and are allowed to drop, one at a time in each chute, into positions between the platens 55, 56, and the plate member. For this purpose, pairs of gating cylinders 83 and 84 are provided, against which the stacks of nail plates rest. Such cylinders are mounted on shafts 85 extending across both guide chutes 67 and 68 and are rotatably supported in bearing brackets 86 extending from the side walls of the chutes. Such cylinders extend into openings 69 formed in the chute walls. Longitudinally extending slots 87 and 88 are formed in the cylinder 83 and 84, respectively, to receive the opposite ends of the two lowermost nail plates and to normally hold the same from dropping into the lower part of the chutes. Arms 90 fastened to the shafts 85 are pivotally connected to the pistons 91 of air cylinders 92 and 93 pivotally supported at 89 from the side walls of the respective chutes.

When air pressure is applied to lower inlet lines 94 of the cylinders 92 and 93 their pistons 91 rock the gating cylinder 83 counter-clockwise and gating cylinder 84 clockwise approximately 90° to the lowermost pair of nail plates in the two guide chutes 67 and 68 and to release the same to drop into the lower most portions of their respective chutes. Such released nail plates strike the shoulder 75 and 76, causing them to rock about such shoulders into vertical positions and then drop into their lowermost positions shown in FIG. 3 where they are arrested by the base plates 25 and 26 in front of the platens 55 and 56.

Figure 7:
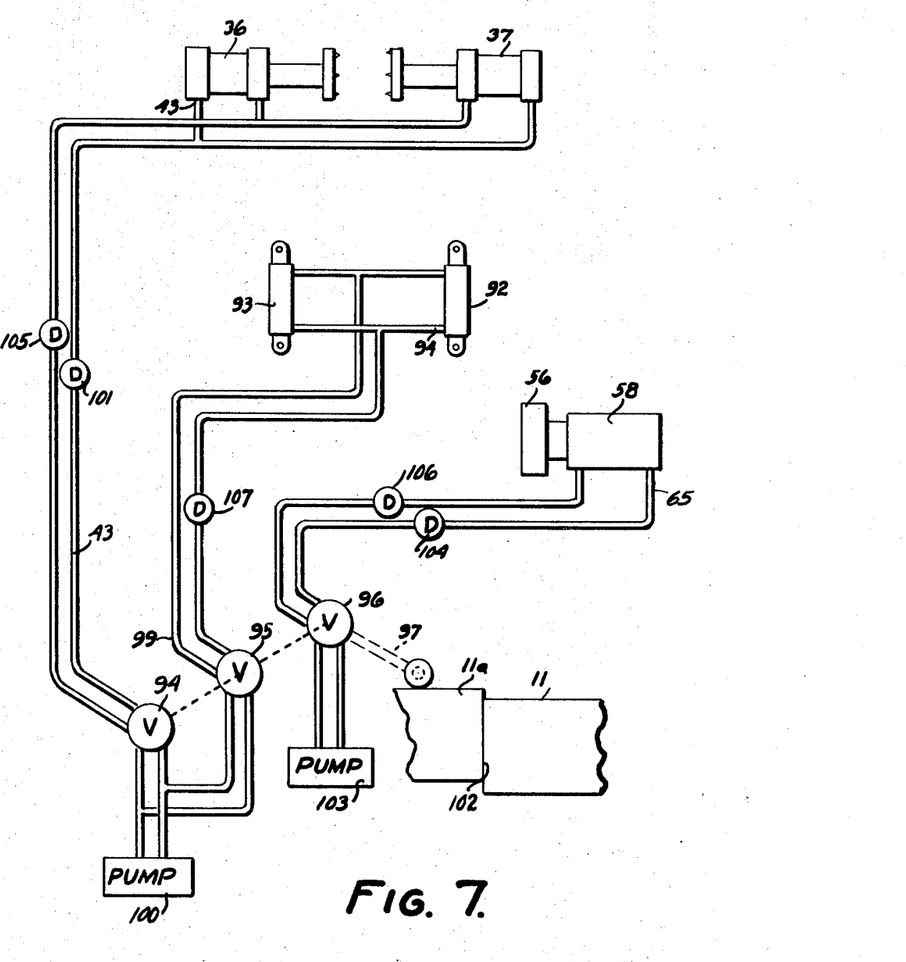
FIG. 7 is a schematic diagram of the controls for the various fluid operated cylinders.
Figure 8:
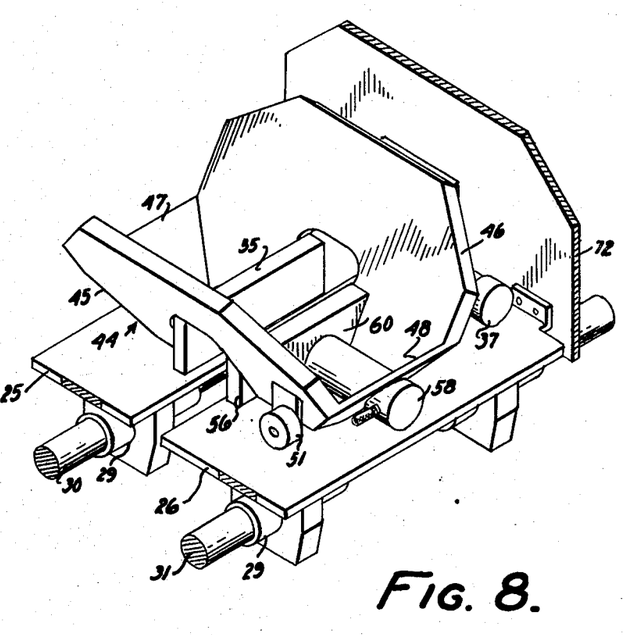
FIG. 8 is a perspective view of the fastening carriage with the housing and guide chutes removed.

FIG. 7 illustrates the fluid controls for the various aforementioned fluid cylinders.

A set of valves 94, 95, and 96 are actuated by a follower arm 97 (see also FIG. 2) which follows the upper edges of the various plate members, i.e., 11 and 11a, as the latter are driven endwise in the direction of the arrow A. When the arm 97 is engaged by the leading edge of a new plate member it is raised, as shown in FIG. 7, setting the valves 94, 95, and 96 to transfer fluid as follows: Valve 94 transfer air under pressure from an air pump 100 through line 43 and a suitable constriction or delay device 101 to actuate the clamp cylinder 36 and 37 thus coupling the carriage 23 to the plate member 11 to move therewith. The delay device 101 delays actuation of the cylinders 36 and 37 until the joint 102 between the two plate members reaches a point substantially midway between ends of the platens 55 and 56. Valve 95 transfer air under pressure through line 99 from the pressure supply pump 100 to the lower ends of the air cylinder 92 and 93, causing them to extend their pistons and thus rock the gate cylinders to feed in nail plates and valve 96 transfers hydraulic fluid under pressure from a suitable pump 103 through the inlet line 65 to cylinder 58, causing the same to force the platens 55 and 56 inwardly to embed the aligned nail plates 24 into the opposite sides of the adjoining plate members. Delay device 104 is connected in the line 65 to delay actuation of the cylinder 58 until the cylinders 36 and 37 have gripped the interposed plate member sufficiently to cause the carriage to move with such plate member.

When leading edge of the plate member, i.e., 11a, has been lower by the rollers 65, 66, and 67, FIG. 2., to the level of the preceding plate member, i.e., 11, the valves 94, 95, and 96 are set in an alternate position to retract the cylinders 36, 37, and 58 and to retract the cylinders 92 and 93 so as to rock the gate cylinders into their illustrated positions. Delay devices 105, 106, and 107 are provided in the fluid conveying lines for retracting the cylinders 36, 37, and 58 and for extending the cylinders 92 and 93 to delay such action until the fastening operation has been completed, at which time the carriage 23 is returned to its initial position by return spring device 35.

We claim:

1. Apparatus for attaching structural members together comprising
   means for advancing said members in abutting end-to-end relation,
   a carriage,
   means guiding said carriage for a movement in the direction of movement of said members,
   a member engaging device on said carriage for causing said carriage to move with said members from an initial position,
   means for causing said engaging device to selectively engage and disengage a said member,
   means on said carriage supporting a toothed nail plate, and
   means on said carriage for embedding said plate in abutting ends of two successive members during movement of said carriage with said members.

2. Apparatus according to claim 1 comprising
   means responsive to disengagement of said engaging device for returning said carriage to said initial position.

3. Apparatus according to claim 2 wherein said last mentioned means comprises a device for continually and yieldably urging said carriage toward said initial position.

4. Apparatus according to claim 1 wherein said member engaging device and said embedding means comprises fluid operated devices.

5. Apparatus according to claim 1 wherein said embedding means comprises a fluid operated C-frame press straddling said advancing members;
   and means on said carriage for guiding said press for movement transversely of the direction of movement of said carriage.

6. Apparatus for attaching structural members together comprising
   means for advancing said members in abutting end-to-end relation,
   a carriage,
   means for causing said carriage to move with said members from an initial position and for thereafter returning said carriage to said initial position,
   means on said carriage supporting a toothed nail plate on one side of said members, and
   means on said carriage for embedding said plate in the abutting ends of two successive members during movement of said carriage with said members.

7. Apparatus according to claim 6 wherein said embedding means comprises
   a press having a pair of platens on opposite sides of said members,
   said platens being movable toward and away from each other,
   means on said carriage for guiding said press transversely of the direction of movement of said carriage,
   means supporting a second toothed nail plate on the opposite side of said members, and
   means for actuating said press to move said platens toward each other during movement of said carriage with said members whereby to embed said plates into said abutting ends.

8. Apparatus according to claim 7 comprising means controlled by one of said members for causing operation of said last mentioned means.

9. Apparatus according to claim 7 wherein said carriage moving means comprises
   a gripping device adapted to grip a said member,
   and yieldable means connecting said gripping device to said carriage.

10. Apparatus for attaching structural members together comprising
    means for advancing said members in abutting end-to-end relation,
    a carriage,
    means for causing said carriage to move with said members from an initial position,
    a guide chute on said carriage for guiding a nail plate to a position along one side of the abutting ends of said members,
    means on said carriage for embedding said plate when in said position during said movement of said carriage,
    gating means for normally preventing said plate from moving to said position, and
    means controlled by one of said members for actuating said gating means to release said plate to move to said position and for actuating said embedding means.

11. Apparatus according to claim 9 comprising a spring device for returning said carriage to said initial position, and means controlled by said last mentioned means for enabling said spring device to return said carriage.

12. Apparatus for attaching elongate structural members together comprising
    means for feeding said members in abutting end-to-end relation without stopping,
    a carriage,
    means for guiding said carriage parallel to direction of movement of said members,
    a gripping device on said carriage for gripping said member to cause said carriage to move with said members from an initial position, means on said carriage for supporting a pair of toothed nail plates on opposite sides of the abutting ends of said members, a press supported by said carriage for movement transversely of the direction of movement of said carriage, said press having platens on opposite sides of said members and engageable with respective ones of said plates to embed said plates in said abutting ends of two successive members, means controlled by one of said members for actuating said gripping device upon movement of said abutting ends of said members adjacent said platens whereby to cause said carriage to move with said members, means controlled by one of said members for causing said press to embed said plates in said members during movement of said carriage with said members, means for thereafter releasing said gripping device, and means responsive to release of said gripping device for returning said carriage to said initial position.

13. Apparatus for attaching wooden structural members together comprising means for advancing said members in abutting end-to-end relation, a carriage, means for causing said carriage to move with said members from an initial position, a pair of guide chutes on said carriage for guiding toothed nail plates under the influence of gravity to positions along opposite sides of the abutting ends of successive members, gating means for normally preventing said plates from moving through said chutes, a press supported by said carriage for movement transversely of the direction of said carriage, said press having platens on opposite sides of said members and engageable with respective ones of said plates at said positions to embed said plates in said abutting ends of two successive members, means controlled by one of said members when said abutting ends of said two successive members move between said platens for causing operation of said carriage moving means and said press whereby to embed said plates in said abutting ends of two successive members, and means controlled by one of said members for actuating said gating means to release a said plate in each of said chutes.

* * * * *